US012157225B1

(12) United States Patent
Stoyanov Bonev

(10) Patent No.: US 12,157,225 B1
(45) Date of Patent: Dec. 3, 2024

(54) DEVICE AND METHOD FOR PRECISE CONVERSION OF CARTESIAN COORDINATES TO SPHERICAL COORDINATES

(71) Applicant: Jordan Stoyanov Bonev, Haworth, NJ (US)

(72) Inventor: Jordan Stoyanov Bonev, Haworth, NJ (US)

( * ) Notice: Subject to any disclaimer, the term of this patent is extended or adjusted under 35 U.S.C. 154(b) by 0 days.

(21) Appl. No.: 18/803,372

(22) Filed: Aug. 13, 2024

(51) Int. Cl.
*B25J 9/02* (2006.01)
*G06F 7/548* (2006.01)

(52) U.S. Cl.
CPC ............. *B25J 9/026* (2013.01); *G06F 7/548* (2013.01)

(58) Field of Classification Search
CPC ................... B25J 9/026; G06F 7/548
See application file for complete search history.

(56) References Cited

FOREIGN PATENT DOCUMENTS

SU 416701 A * 6/1974

* cited by examiner

*Primary Examiner* — Dale Moyer
(74) *Attorney, Agent, or Firm* — Novel Patent Services

(57) ABSTRACT

The present invention relates to a device that converts Cartesian coordinates into spherical coordinates, thereby providing an accurate and efficient solution for applications requiring precise spherical coordinate transformations. The device comprises a base, a first gantry, a second gantry, a first slider, a second slider, and a pair of spherical elements. The device offers a practical, cost-effective, and reliable alternative by focusing on mechanical components and reducing reliance on complex electronics. The device supports a broad range of applications, including scientific instruments, engineering tools, and educational devices, where precision and reliability are essential. The device converts the Cartesian coordinates into spherical coordinates, thereby providing an accurate and efficient solution for applications requiring precise spherical coordinate transformations.

17 Claims, 6 Drawing Sheets

DEVICE AND METHOD FOR PRECISE CONVERSION OF CARTESIAN COORDINATES TO SPHERICAL COORDINATES

FIELD OF THE INVENTION

The present disclosure relates generally to coordinate transformation systems, and more particularly to a device and method that converts Cartesian coordinates into spherical coordinates, thereby providing an accurate and efficient solution for applications requiring precise spherical coordinate transformations.

BACKGROUND

Cartesian coordinate systems are fundamental in fields such as science, engineering, and mathematics for representing and manipulating spatial data. Their simplicity and direct representation make them highly suitable for various applications, including computer graphics, robotics, and simulations. The Cartesian coordinates excel in scenarios where data is arranged along linear axes, thus facilitating calculations and visualization of spatial relationships.

However, there are specific scenarios where spherical coordinates are more appropriate. Spherical coordinates offer a more natural representation for systems with rotational symmetry or those operating within a spherical volume, such as celestial mechanics, geophysical studies, and certain types of mechanical systems. By using radial distance, polar angle, and azimuthal angle, spherical coordinates provide an intuitive and effective way to describe spatial positions in these contexts.

Transforming the Cartesian coordinates into spherical coordinates generally involves complex mathematical calculations. These calculations are often performed by software algorithms or specialized electronic systems. While these electronic methods are effective, they typically require substantial computational resources and advanced hardware. This complexity can be problematic for real-time applications or in environments with limited computational power, where quick and on-the-fly transformations are necessary.

Currently, there is a notable lack of simple mechanical systems designed for efficient coordinate transformation. Most existing solutions rely heavily on electronic processing or are built around complex machinery, thereby making them challenging to use and integrate. This presents a significant opportunity for a mechanical system capable of performing the Cartesian-to-spherical transformation with minimal complexity and high reliability.

Existing techniques for transforming the Cartesian coordinates to spherical coordinates predominantly depend on electronic systems or complex algorithms. These methods, while effective, are often computationally intensive and require significant processing power and sophisticated hardware. Such systems can be costly and may not be ideal for applications with limited resources or where real-time processing is critical. The complexity of these electronic solutions can also lead to higher maintenance requirements and potential reliability issues, making them less practical for some use cases.

To address these limitations, there is a need for a device that converts Cartesian coordinates into spherical coordinates, thereby providing an accurate and efficient solution for applications requiring precise spherical coordinate transformations. There is also a need for a device that offers a practical, cost-effective, and reliable alternative by focusing on mechanical components and reducing reliance on complex electronics. Furthermore, there is also a need for a device that supports a broad range of applications, including scientific instruments, engineering tools, and educational devices, where precision and reliability are essential.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments nor delineate the scope of any or all embodiments.

The present disclosure, in one or more embodiments, relates to a device that converts Cartesian coordinates into spherical coordinates, thereby providing an accurate and efficient solution for applications requiring precise spherical coordinate transformations. The device offers a practical, cost-effective, and reliable alternative by focusing on mechanical components and reducing reliance on complex electronics. The device supports a broad range of applications, including scientific instruments, engineering tools, and educational devices, where precision and reliability are essential.

In one embodiment herein, the device comprises a base, a first gantry, a second gantry, a first slider, a second slider, and a pair of spherical elements. In one embodiment herein, the base is configured to support an upper platform through a plurality of supporting members. In one embodiment herein, the base, the upper platform, the first slider, and the second slider are made of an acrylic material.

In one embodiment herein, the first gantry is operatively connected to a first driving unit. The first gantry is configured to move along a first axis in response to activation of the first driving unit. In one embodiment herein, the second gantry is operatively connected to a second driving unit. The second gantry is configured to move along a second axis perpendicular to the first axis in response to activation of the second driving unit. In one embodiment herein, the first driving unit and the second driving unit are electric motors.

In one embodiment herein, the base comprises a first track that is configured to facilitate the movement of the first gantry along a predefined path. The base also comprises a second track that is configured to facilitate the movement of the second gantry along a predefined path perpendicular to the first track.

In one embodiment herein, the first gantry and the second gantry are mounted on threaded shafts of the first driving unit and the second driving unit, respectively, thereby facilitating precise and smooth movement along their respective axes. In one embodiment herein, the threaded shafts of the first driving unit and the second driving unit are rotatably connected to their respective pedestal bearings, thereby facilitating smooth rotational motion of the threaded shafts.

In one embodiment herein, the first slider is securely affixed to the first gantry. The first slider is configured to move based on the movement of the first gantry. In one embodiment herein, the second slider securely is securely affixed to the second gantry. The second slider is configured to move based on the movement of the second gantry.

In one embodiment herein, the first slider and the second slider comprise at least two primary apertures and at least two secondary apertures, respectively. The at least two primary apertures and the at least two secondary apertures are configured to intersect respectively to form a pair of slots.

In one embodiment herein, the pair of spherical elements is positioned in a pair of openings on the upper platform. The spherical elements are retained in the openings of the upper platform due to their radii being larger than the radii of the openings.

In one embodiment herein, each spherical element comprises an elongated member that extends through the corresponding slot formed by the intersection of the primary apertures of the first slider and the secondary apertures of the second slider.

In one embodiment herein, the coordinated movement of the first gantry and the second gantry facilitates the movement of the elongated members within the slots, thereby adjusting azimuthal and polar orientations of the spherical elements to enable the conversion of the Cartesian coordinates into spherical coordinates.

According to an aspect, a method is disclosed for converting the Cartesian coordinates into spherical coordinates using the device. First, at one step, the first driving unit is activated to move the first gantry along the first axis, while the second driving unit is simultaneously activated to move the second gantry along the perpendicular second axis, thereby adjusting the polar orientation ($\theta$) and the azimuthal orientation ($\varphi$) of the spherical elements by facilitating the movement of their elongated members within intersecting slots formed by the primary apertures of the first slider and the secondary apertures of the second slider, respectively.

At another step, the displacement inputs $\Delta x$ and $\Delta y$ resulting from the activation of the first driving unit and the second driving unit, respectively, are determined. At another step, the vertical displacement (h) between the plane of the intersection of the sliders and the upper platform holding the spherical elements, and the initial coordinates ($x_0$, $y_0$) of the intersection of the slots formed by the primary apertures and the secondary apertures are determined.

At another step, the polar orientation ($\theta$) is computed based on the vertical displacement (h) and the initial coordinates ($x_0$, $y_0$) of the intersection of the slots. Further, at another step, the azimuthal orientation ($\varphi$) is computed using the displacement inputs $\Delta x$ and $\Delta y$ and the initial coordinates ($x_0$, $y_0$) of the intersection of the slots, thereby converting the Cartesian coordinates into the spherical coordinates ($\theta$, $\varphi$) based on the computed polar and azimuthal orientations.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1:
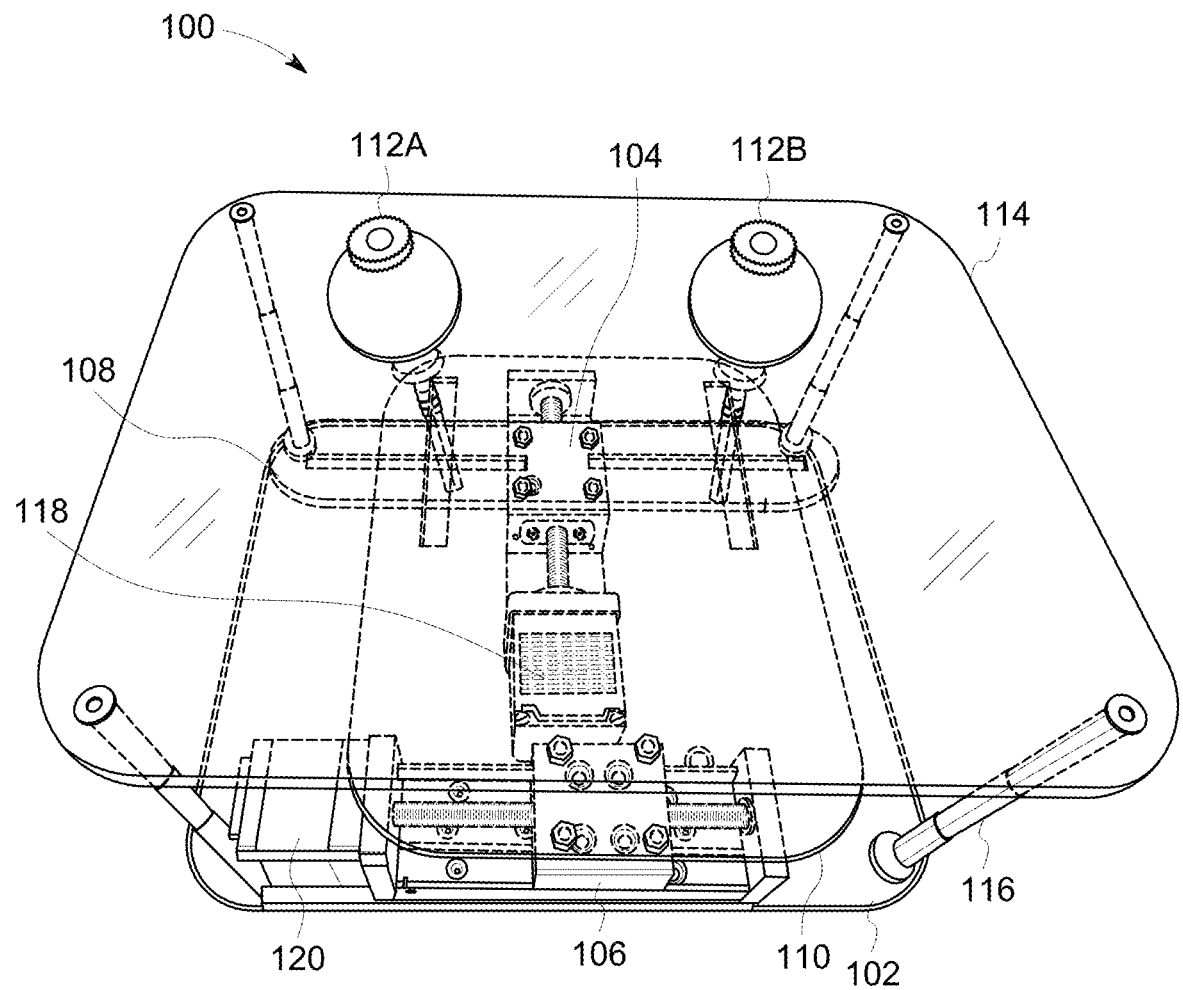
FIG. 1 illustrates a perspective view of a device for converting Cartesian coordinates into spherical coordinates, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1 refers to a perspective view of a device 100 for converting Cartesian coordinates into spherical coordinates. In one embodiment herein, the device 100 is configured to convert the Cartesian coordinates into spherical coordinates, thereby providing an accurate and efficient solution for applications requiring precise spherical coordinate transformations. The device 100 offers a practical, cost-effective, and reliable alternative by focusing on mechanical components and reducing reliance on complex electronics. The device 100 supports a broad range of applications, including scientific instruments, engineering tools, and educational devices, where precision and reliability are essential.

In one embodiment herein, the device 100 comprises a base 102, a first gantry 104, a second gantry 106, a first slider 108, a second slider 110, and a pair of spherical elements (112A, 112B). The base 102 is configured to provide stable support for an upper platform 114, which is secured to the base 102 through a plurality of supporting members 116. The supporting members 116 ensure that the upper platform 114 is maintained at a fixed height relative to the base 102, thereby providing a robust structure for the operation of the device 100. In one embodiment herein, the base 102, the upper platform 114, the first slider 108, and the second slider 110 may be constructed from an acrylic material, which provides the necessary rigidity and durability while ensuring ease of fabrication. The acrylic material is preferred due to its lightweight nature and its ability to be precisely machined, which is essential for maintaining the accuracy of the component alignments.

Figure 2:
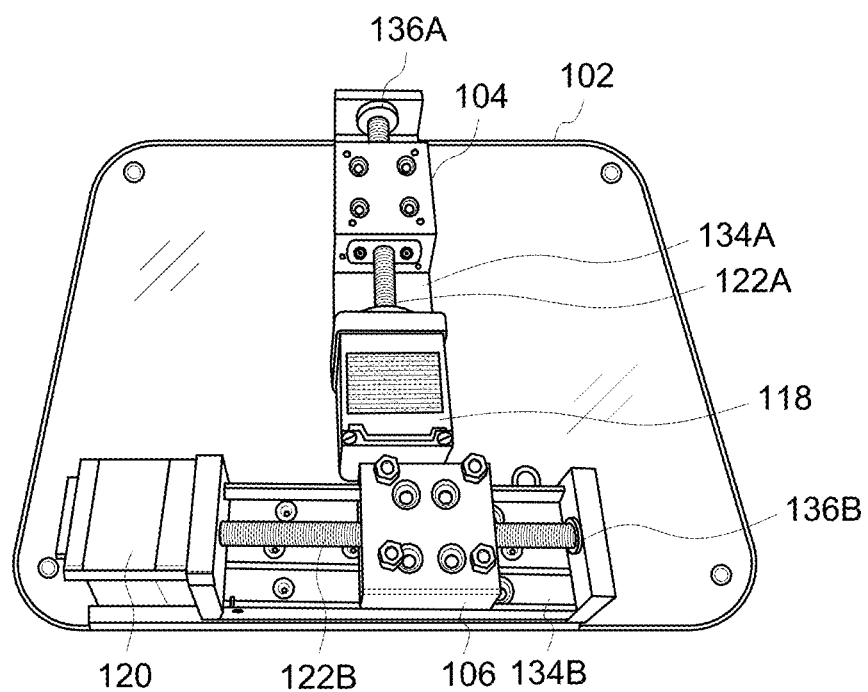
FIG. 2 illustrates a top view of a first gantry and a second gantry mounted on a base of the device, in accordance with embodiments of the invention.

FIG. 2 refers to a top view of the first gantry 104 and the second gantry 106 mounted on the base 102 of the device 100. In one embodiment herein, the first gantry 104 is operatively connected to a first driving unit 118, which controls its movement along a designated first axis. The movement of the first gantry 104 is controlled by the activation of the first driving unit 118. Similarly, the second gantry 106 is operatively connected to a second driving unit 120, which governs its movement along a second axis that is perpendicular to the first axis. The movement of the second gantry 106 is controlled by the activation of the second driving unit 120. In one embodiment herein, the first driving unit 118 and the second driving unit 120 can be electric motors.

In one embodiment herein, the base 102 comprises a first track 134A that is configured to facilitate the movement of the first gantry 104 along a predefined path. The first track 134A may include linear guides that engage with the first gantry 104 to ensure smooth and precise movement along the first axis. The base 102 also comprises a second track 134B that is configured to facilitate the movement of the second gantry 106 along a predefined path perpendicular to the first track 134A. The second track 134B may also include linear guides that engage with the second gantry 106 to ensure smooth and precise movement along the second axis. This arrangement allows the first gantry 104 and the second gantry 106 to move independently.

In one embodiment herein, the first gantry 104 and the second gantry 106 are mounted on threaded shafts (122A, 122B) of the first driving unit 118 and the second driving unit 120, respectively, thereby facilitating precise and smooth movement along their respective axes. The threaded shafts (122A, 122B) may engage with corresponding threaded nuts attached to the first gantry 104 and the second gantry 106, thereby converting rotational motion into linear motion with high precision. This mechanism ensures that any rotation of the threaded shafts (122A, 122B) by the driving units (118, 120) translates directly into controlled and accurate movement of the gantries (104, 106) along their respective paths.

In one embodiment herein, the threaded shafts (122A, 122B) of the first driving unit 104 and the second driving unit 106 are rotatably connected to their respective pedestal bearings (136A, 136B), thereby facilitating smooth rotational motion of the threaded shafts (122A, 122B). The pedestal bearings (136A, 136B) are configured to minimize friction and support the threaded shafts (122A, 122B) during rotation, thereby allowing for efficient and stable operation of the first gantry 104 and the second gantry 106. This combination of the threaded shafts (122A, 122B) and the pedestal bearings (136A, 136B) ensures that the first gantry 104 and the second gantry 106 can be moved with a high degree of accuracy and minimal resistance, thereby contributing to the overall precision of the device 100 in converting the Cartesian coordinates into spherical coordinates.

Figure 3:
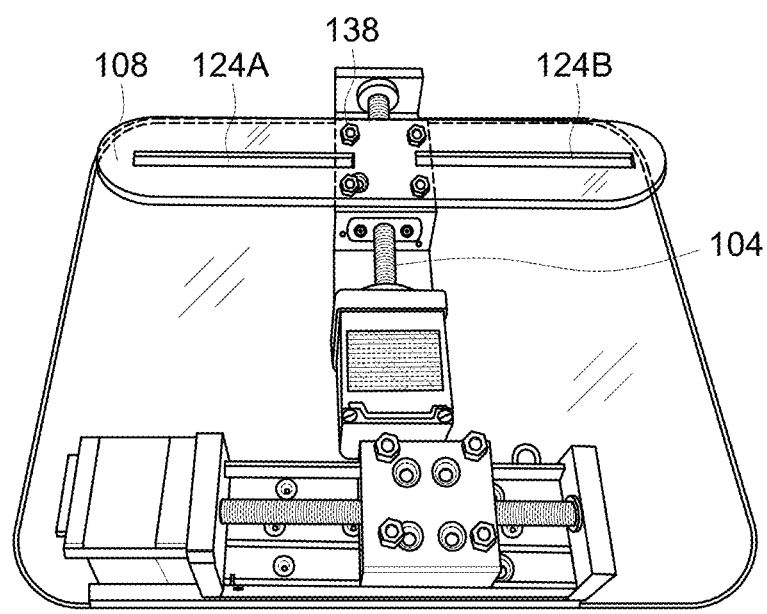
FIG. 3 illustrates a top view of the first slider mounted on the first gantry, in accordance with embodiments of the invention.

FIG. 3 refers to a top view of the first slider 108 mounted on the first gantry 104. In one embodiment herein, the first slider 108 is securely affixed to the first gantry 104 though a plurality of fasteners 138. The first slider 108 is configured to move in accordance with the movement of the first gantry 104. This secure affixation ensures that the first slider 108 maintains its alignment and stability during operation, thereby facilitating precise and reliable motion. In one embodiment herein, the first slider 108 comprises at least two primary apertures (124A, 124B) that are elongated along an x-axis. In one embodiment herein, the plurality of fasteners 138 can be, but not limited to bolts, screws, rivets and other suitable fastening devices.

Figure 4:
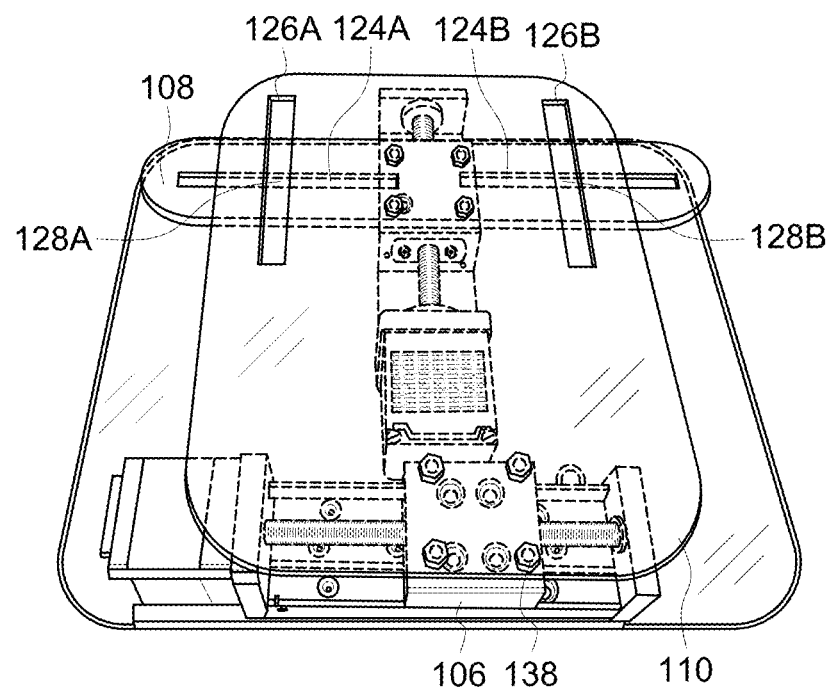
FIG. 4 illustrates a top view of the second slider mounted on the second gantry, in accordance with embodiments of the invention.

FIG. 4 refers to a top view of the second slider 110 mounted on the second gantry 106. In one embodiment herein, one portion of the second slider 110 is securely affixed to the second gantry 106 through the plurality of fasteners 138. The second slider 110 is configured to move in response to the movement of the second gantry 106. Other portion of the second slider 110 comprises at least two secondary apertures (126A, 126B) that are elongated along a y-axis. In one embodiment herein, the primary apertures (124A, 124B) of the first slider 108 are configured to intersect with the secondary apertures (126A, 126B) of the second slider 110, respectively, thereby forming a pair of slots (128A, 128B).

Figure 5:
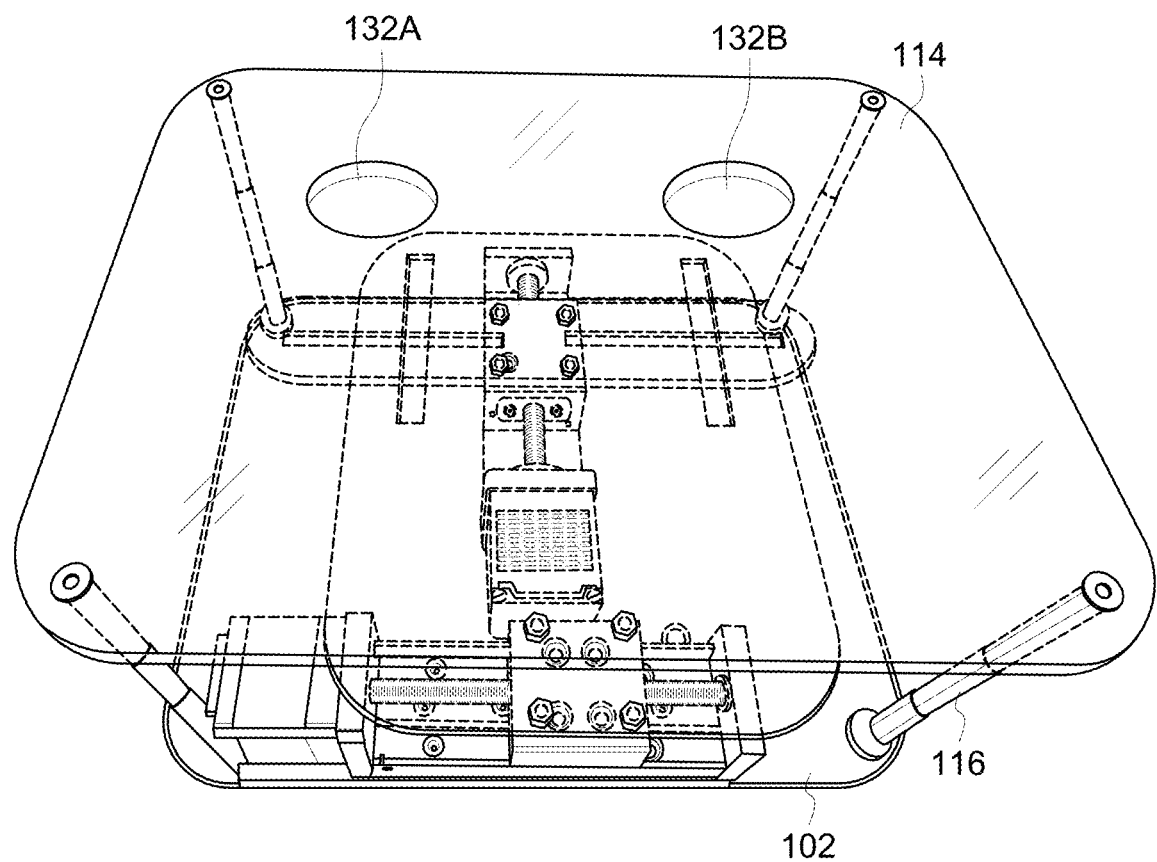
FIG. 5 illustrates a top view of an upper platform supported on the base through a plurality of support members, in accordance with embodiments of the invention.

FIG. 5 refers to a top view of the upper platform 114 supported on the base 102 through the plurality of support members 116. In one embodiment herein, the upper platform 114 is constructed to be at a fixed height relative to the base 102, thereby ensuring a consistent operational environment for the spherical elements (112A, 112B) (shown in FIG. 1). The support members 116 provide structural integrity, thereby preventing any displacement or instability of the upper platform 114 during operation. The upper platform 114 comprises at least two openings (132A, 132B) that are configured to accommodate the spherical elements (112A, 112B). These openings (132A, 132B) have smaller radii compared to the spherical elements (112A, 112B). This design ensures that the spherical elements (112A, 112B) are securely placed within their respective openings (132A, 132B).

The smaller radii of the openings (132A, 132B) relative to the spherical elements (112A, 112B) facilitate to center the spherical elements (112A, 112B) accurately, thereby minimizing any potential movement or misalignment. This precise placement is crucial for maintaining the accuracy of the coordinate transformations performed by the device 100. The openings (132A, 132B) are precisely machined to match the dimensions of the spherical elements (112A, 112B), thereby ensuring that the spherical elements (112A, 112B) are held firmly in place while allowing for the necessary adjustments in orientation.

Referring to FIG. 1, the spherical elements (112A, 112B) are equipped with respective elongated members (130A, 130B) that extend through the slots (128A, 128B) formed by the intersection of the primary apertures (124A, 124B) of the first slider 108 and the secondary apertures (126A, 126B) of the second slider 110. This configuration allows the spherical elements (112A, 112B) to be supported and adjusted within the slots (128A, 128B). In one embodiment herein, the coordinated movement of the first gantry 104 and the second gantry 106 facilitates the movement of the elongated members (130A, 130B) within their respective slots (128A, 128B). This movement enables the adjustment of the azimuthal and polar orientations of the spherical elements (112A, 112B), thereby allowing the device 100 to convert the Cartesian coordinates into spherical coordinates accurately.

In one embodiment herein, the operation of the device 100 is disclosed in a step-by-step process. The operation begins with the activation of the first driving unit 118 and the second driving unit 120 by a user. These driving units (118, 120) control the movement of the first gantry 104 and the second gantry 106 along their respective axes. The first driving unit 118 causes the first gantry 104 to move along the first axis. Simultaneously, the second driving unit 120 causes the second gantry 106 to move along the second axis, which is perpendicular to the first axis.

The movement of the first gantry 104 translates into movement of the first slider 108 mounted on it. Likewise, the movement of the second gantry 106 translates into movement of the second slider 110 mounted on it. As the first slider 108 and the second slider 110 move, the elongated members (130A, 130B) of the spherical elements (112A, 112B) are guided within their respective slots (128A, 128B), thereby enabling adjustment of the positions of the spherical elements (112A, 112B).

The coordinated movement of the first slider 108 and the second slider 110, driven by the first gantry 104 and the second gantry 106, adjusts the azimuthal and polar orientations of the spherical elements (112A, 112B). Geometrically, displacement inputs Δx and Δy from the first driving unit 118 and the second driving unit 120, respectively, may alter the polar (θ) and azimuthal (φ) orientations of the spherical elements (112A, 112B). In one embodiment herein, height (h) is given between the plane of the intersection of the first slider 108 and the second slider 110, and the upper platform 114 holding the spherical elements (112A, 112B), and with the slots (128A, 128B) formed by the intersection of the primary apertures (124A, 124B) of the first slider 108 and the secondary apertures (126A, 126B) of the second slider 110 located at $x_0$ and $y_0$. The conversion from the displacement inputs Δx and Δy from the first driving unit 118 and the second driving unit 120 to spherical coordinates (θ, φ) can be expressed as follows.

For the polar orientation (θ):

$$\Delta\theta = \frac{\pi}{2} - \cos^{-1}\left(\frac{-h}{\sqrt{x_o^2 + y_0^2 + h^2}}\right)$$

For the azimuthal orientation (φ):

$$\Delta\varphi = \tan^{-1}\left(\frac{\Delta y}{\Delta x}\right) - \tan^{-1}\left(\frac{y_0}{x_o}\right)$$

Where, Δx is the displacement input from the first driving unit 118, Δy is the displacement input from the second driving unit 120. Where, $x_0$ is the initial x-coordinate of the intersection point of the slots (128A, 128B) formed by the intersection of the primary apertures (124A, 124B) of the first slider 108 and the secondary apertures (126A, 126B) of the second slider 110. Where, $y_0$ is the initial y-coordinate of the intersection point of the slots (128A, 128B) formed by the intersection of the primary apertures (124A, 124B) of the first slider 108 and the secondary apertures (126A, 126B) of the second slider 110. Where, h is the vertical displacement between the plane of the intersection of the first slider 108 and the second slider 110, and the upper platform 114 holding the spherical elements (112A, 112B). Where, θ represents the polar angle, which changes with the vertical displacement of the spherical elements (112A, 112B). Where, φ represents the azimuthal angle, which changes with the horizontal displacement of the spherical elements (112A, 112B).

In one embodiment herein, the device 100 uses the coordinated movement of the first slider 108 and the second slider 110 driven by the first driving unit 118 and the second driving unit 120, respectively, to achieve these changes in orientation. By precisely controlling the displacement inputs (Δx, Δy), the device 100 can convert the Cartesian coordinates into the corresponding spherical coordinates (θ, φ) with high accuracy.

Overall, the device 100 for converting the Cartesian coordinates into spherical coordinates offers several key benefits. Firstly, the device 100 simplifies the conversion process by using a mechanical system instead of complex electronic methods. This mechanical approach reduces the computational load usually associated with coordinate transformations, thereby making the system more efficient and less likely to experience processing delays. The device 100 delivers high precision in converting coordinates with components such the first gantry 104, the second gantry 106, the first slider 108, the second slider 110, and the spherical elements (112A, 112B), thereby ensuring accurate results even in real-time applications. The use of threaded shafts (122A, 122B) along with primary driving unit 118 and the secondary driving unit 120 further enhances the system's accuracy and smoothness of operation. Moreover, the mechanical design of the device 100 reduces the risk of errors commonly found in electronic systems, such as software errors and hardware failures, thereby making the system more reliable and robust overall.

From a commercial perspective, the invention offers significant cost and operational benefits. The device 100 lowers the production and maintenance costs associated with electronic coordinate transformation systems by reducing reliance on sophisticated electronics and complex procedures. The mechanical simplicity of the device 100 translates into a more affordable and accessible solution for industries that require accurate coordinate conversions, such as scientific research, engineering, and education. Furthermore, the robustness and reduced complexity of the device 100 enhance its durability and reliability, thereby making it a long-term investment with lower maintenance requirements. The versatile nature of the system, which is capable of handling a broad range of applications may allow the device 100 to serve various markets, thereby potentially expanding its commercial appeal. The ability to deliver precise results in resource-limited or real-time environments makes the device 100 an attractive option for cost-conscious buyers seeking dependable performance without the need for high-end computational resources.

Figure 6:
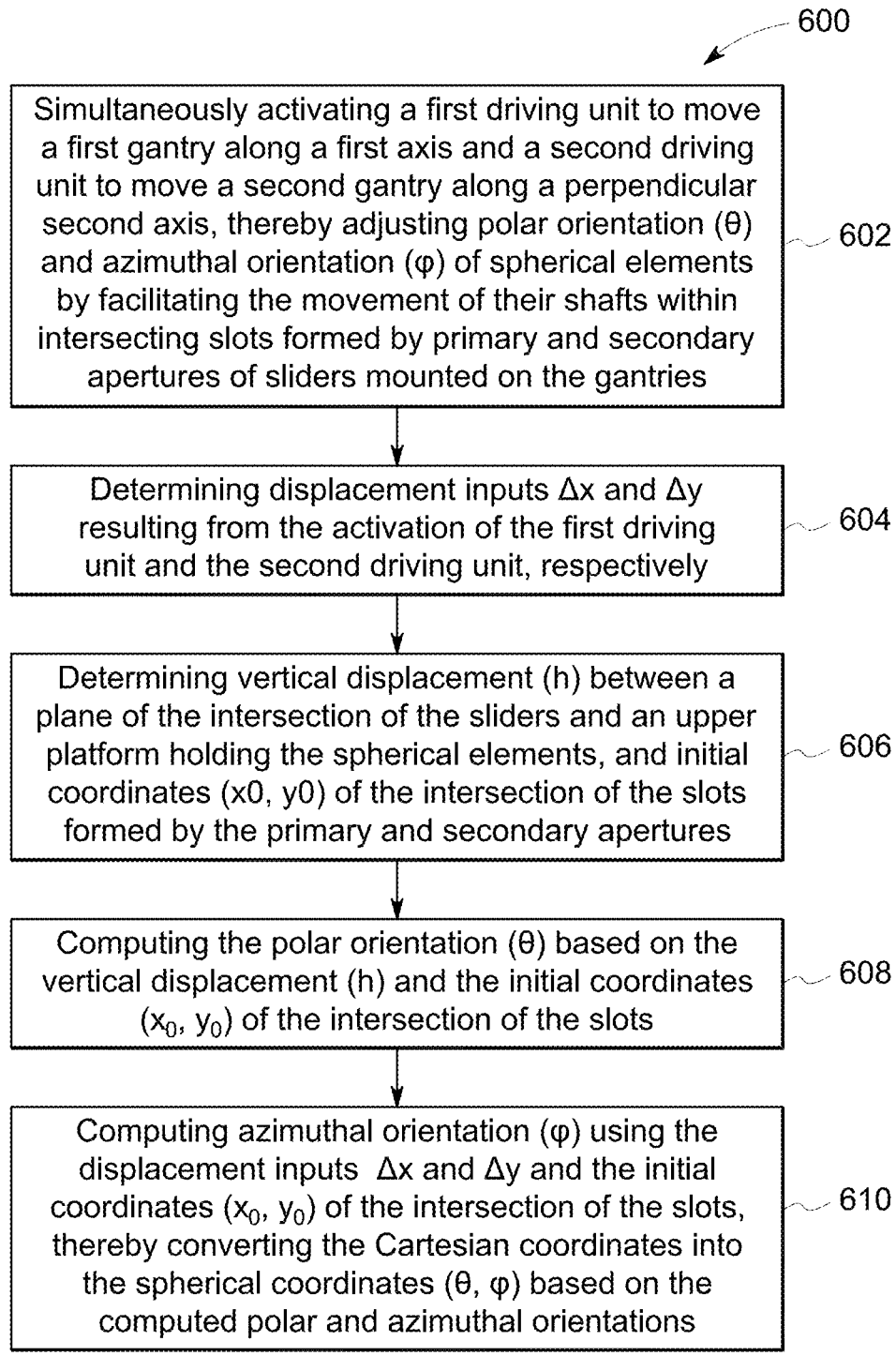
FIG. 6 illustrates a flowchart of a method for converting the Cartesian coordinates into spherical coordinates using the device, in accordance with embodiments of the invention.

FIG. 6 refers to a flowchart 600 of a method for converting the Cartesian coordinates into spherical coordinates using the device 100. First, at step 602, the first driving unit 118 is activated to move the first gantry 104 along a first axis, while the second driving unit 120 is simultaneously activated to move the second gantry 106 along a perpendicular second axis, thereby adjusting the polar orientation (θ) and the azimuthal orientation (φ) of the spherical elements (112A, 112B) by facilitating the movement of their elongated members (130A, 130B) within intersecting slots (128A, 128B) formed by the primary apertures (124A, 124B) of the first slider 108 and the secondary apertures (126A, 126B) of the second slider 110, respectively.

At step 604, the displacement inputs Δx and Δy resulting from the activation of the first driving unit 118 and the second driving unit 120, respectively, are determined. At step 606, the vertical displacement (h) between the plane of the intersection of the sliders (108, 110) and the upper platform 114 holding the spherical elements (112A, 112B), and initial coordinates ($x_0$, $y_0$) of the intersection of the slots (128A, 128B) formed by the primary apertures (124A, 124B) and the secondary apertures (126A, 126B) are determined.

At step 608, the polar orientation (θ) is computed based on the vertical displacement (h) and the initial coordinates ($x_0$, $y_0$) of the intersection of the slots (128A, 128B). Further, at step 610, the azimuthal orientation (φ) is computed using the displacement inputs Δx and Δy and the initial coordinates ($x_0$, $y_0$) of the intersection of the slots (128A, 128B), thereby converting the Cartesian coordinates into the spherical coordinates (θ, φ) based on the computed polar and azimuthal orientations.

In another exemplary embodiment of the invention, the first driving unit 118 and the second driving unit 120 may be operated by a control system, which provides automated management of the movements of the first gantry 104 and the second gantry 106. This control system not only activates and regulates the driving units (118, 120) but also performs the necessary computations based on pre-stored formulae. The computed polar and azimuthal orientations are then processed by the control system to determine the spherical coordinates. The results of these computations are subsequently displayed on a display unit, thereby providing real-time feedback and visualization of the coordinate transformations for the user. This integration of a control system enhances the precision and case of operation by automating the adjustment process and streamlining data presentation.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A device for converting Cartesian coordinates into spherical coordinates, comprising:
    a base configured to support an upper platform;
    a first gantry operatively connected to a first driving unit, wherein the first gantry is configured to move in response to activation of the first driving unit;
    a second gantry operatively connected to a second driving unit, wherein the second gantry is configured to move in response to activation of the second driving unit;
    a first slider securely affixed to the first gantry, wherein the first slider is configured to move with respective to the movement of the first gantry;
    a second slider securely affixed to the second gantry, wherein the second slider is configured to move with respective to the movement of the second gantry,
    wherein the first slider and the second slider comprise at least two primary apertures and at least two secondary apertures, respectively, wherein the at least two primary apertures are configured to intersect with the at least two secondary apertures, respectively, to form a pair of slots; and
    a pair of spherical elements positioned in a pair of openings on the upper platform, wherein each spherical element comprises an elongated member extending through the corresponding slot formed by the intersection of the primary apertures of the first slider and the secondary apertures of the second slider,
    wherein the coordinated movement of the first gantry and the second gantry facilitates the movement of the elongated members within the slots, thereby adjusting azimuthal and polar orientations of the spherical elements to enable the conversion of the Cartesian coordinates into spherical coordinates.

2. The device for converting the Cartesian coordinates into spherical coordinates of claim 1, wherein the first driving unit and the second driving unit are electric motors.

3. The device for converting the Cartesian coordinates into spherical coordinates of claim 1, wherein the base comprises a first track that is configured to facilitate the movement of the first gantry along a predefined path.

4. The device for converting the Cartesian coordinates into spherical coordinates of claim 1, wherein the base comprises a second track that is configured to facilitate the movement of the second gantry along a predefined path perpendicular to the first track.

5. The device for converting the Cartesian coordinates into spherical coordinates of claim 1, wherein the first gantry and the second gantry are mounted on threaded shafts of the first driving unit and the second driving unit, respectively, thereby facilitating precise and smooth movement along their respective axes.

6. The device for converting the Cartesian coordinates into spherical coordinates of claim 5, wherein other ends of the threaded shafts of the first driving unit and the second driving unit are rotatably connected to their respective pedestal bearings, thereby facilitating smooth rotational motion of the threaded shafts.

7. The device for converting the Cartesian coordinates into spherical coordinates of claim 1, wherein the spherical elements are retained in the openings of the upper platform due to their radii being larger than the radii of the openings.

8. The device for converting the Cartesian coordinates into spherical coordinates of claim 1, wherein the base, the upper platform, the first slider, and the second slider are made of an acrylic material.

9. A device for converting Cartesian coordinates into spherical coordinates, comprising:
    a base configured to support an upper platform through a plurality of supporting members;
    a first gantry operatively connected to a first driving unit, wherein the first gantry is configured to move along a first axis in response to activation of the first driving unit;
    a second gantry operatively connected to a second driving unit, wherein the second gantry is configured to move along a second axis perpendicular to the first axis in response to activation of the second driving unit;
    a first slider securely affixed to the first gantry, wherein the first slider is configured to move based on the movement of the first gantry;
    a second slider securely affixed to the second gantry, wherein the second slider is configured to move based on the movement of the second gantry,
    wherein the first slider and the second slider comprise at least two primary apertures and at least two secondary apertures, respectively, wherein the at least two primary apertures are configured to intersect with the at least two secondary apertures, respectively, to form a pair of slots; and
    a pair of spherical elements positioned in a pair of openings on the upper platform, wherein each spherical element comprises an elongated member extending through the corresponding slot formed by the intersection of the primary apertures of the first slider and the secondary apertures of the second slider,
    wherein the coordinated movement of the first gantry and the second gantry facilitates the movement of the elongated members within the slots, thereby adjusting azimuthal and polar orientations of the spherical elements to enable the conversion of the Cartesian coordinates into spherical coordinates.

10. The device for converting the Cartesian coordinates into spherical coordinates of claim 9, wherein the first driving unit and the second driving unit are electric motors.

11. The device for converting the Cartesian coordinates into spherical coordinates of claim 9, wherein the base comprises a first track that is configured to facilitate the movement of the first gantry along a predefined path.

12. The device for converting the Cartesian coordinates into spherical coordinates of claim 9, wherein the base comprises a second track that is configured to facilitate the movement of the second gantry along a predefined path perpendicular to the first track.

13. The device for converting the Cartesian coordinates into spherical coordinates of claim 9, wherein the first gantry and the second gantry are mounted on threaded shafts of the first driving unit and the second driving unit, respectively, thereby facilitating precise and smooth movement along their respective axes.

14. The device for converting the Cartesian coordinates into spherical coordinates of claim 13, wherein other ends of the threaded shafts of the first driving unit and the second driving unit are rotatably connected to their respective pedestal bearings, thereby facilitating smooth rotational motion of the threaded shafts.

15. The device for converting the Cartesian coordinates into spherical coordinates of claim 9, wherein the spherical elements are retained in the openings of the upper platform due to their radii being larger than the radii of the openings.

16. The device for converting the Cartesian coordinates into spherical coordinates of claim 9, wherein the base, the upper platform, the first slider, and the second slider are made of an acrylic material.

17. A method for converting Cartesian coordinates into spherical coordinates, comprising:

simultaneously activating a first driving unit of a device to move a first gantry along a first axis and a second driving unit to move a second gantry along a perpendicular second axis, thereby adjusting polar orientation ($\theta$) and azimuthal orientation ($\varphi$) of spherical elements by facilitating the movement of their elongated members within intersecting slots formed by primary and secondary apertures of sliders mounted on the gantries;

determining displacement inputs $\Delta x$ and $\Delta y$ resulting from the activation of the first driving unit and the second driving unit, respectively;

determining vertical displacement (h) between a plane of the intersection of the sliders and an upper platform holding the spherical elements, and initial coordinates ($x_0$, $y_0$) of the intersection of the slots formed by the primary and secondary apertures;

computing the polar orientation ($\theta$) based on the vertical displacement (h) and the initial coordinates ($x_0$, $y_0$) of the intersection of the slots; and computing azimuthal orientation ($\varphi$) using the displacement inputs $\Delta x$ and $\Delta y$ and the initial coordinates ($x_0$, $y_0$) of the intersection of the slots, thereby converting the Cartesian coordinates into the spherical coordinates ($\theta$, $\varphi$) based on the computed polar and azimuthal orientations.

\* \* \* \* \*